United States Patent
Weiss et al.

(10) Patent No.: US 9,656,354 B2
(45) Date of Patent: May 23, 2017

(54) METHOD FOR REPAIRING COMPRESSOR OR TURBINE DRUMS

(75) Inventors: Elke Weiss, Hammersbach (DE); Gregor Kappmeyer, Bad Homburg (DE); Florian Stappenbeck, Berlin (DE)

(73) Assignee: Rolls-Royce Deutschland Ltd & Co KG, Blankerfelde-Mahlow (DE)

( * ) Notice: Subject to any disclaimer, the term of this patent is extended or adjusted under 35 U.S.C. 154(b) by 839 days.

(21) Appl. No.: 13/995,876

(22) PCT Filed: Jan. 4, 2012

(86) PCT No.: PCT/EP2012/050094
§ 371 (c)(1),
(2), (4) Date: Aug. 22, 2013

(87) PCT Pub. No.: WO2012/095342
PCT Pub. Date: Jul. 19, 2012

(65) Prior Publication Data
US 2013/0326876 A1    Dec. 12, 2013

(30) Foreign Application Priority Data

Jan. 11, 2011    (DE) .................. 10 2011 002 532

(51) Int. Cl.
  *B23P 6/00*    (2006.01)
  *B23K 35/00*    (2006.01)
  *F01D 5/00*    (2006.01)

(52) U.S. Cl.
  CPC ............ *B23P 6/002* (2013.01); *B23K 35/004* (2013.01); *B23P 6/00* (2013.01); *F01D 5/005* (2013.01);
(Continued)

(58) Field of Classification Search
  CPC .. B23P 6/002; B23P 6/00; B23P 6/005; B23P 6/007; B23K 35/004; F01D 5/005;
(Continued)

(56) References Cited

U.S. PATENT DOCUMENTS

| | | | |
|---|---|---|---|
| 4,897,519 A | * | 1/1990 | Clark .................... B23K 9/046 219/76.14 |
| 4,903,888 A | * | 2/1990 | Clark .................... B23K 9/046 219/121.45 |

(Continued)

FOREIGN PATENT DOCUMENTS

| | | |
|---|---|---|
| DE | 102009004661 | 7/2010 |
| EP | 1881202 | 1/2008 |

(Continued)

OTHER PUBLICATIONS

Machine translation for WO 2013/075815, published Nov. 2011.*
(Continued)

*Primary Examiner* — David Bryant
*Assistant Examiner* — Lawrence Averick
(74) *Attorney, Agent, or Firm* — Shuttleworth & Ingersoll, PLC; Timothy Klima

(57) ABSTRACT

During the repair of welded two-stage or multi-stage compressor or turbine drums, which after welding are machined in the weld area down to a height A, a first material coating with a height B extending on both sides from the root face is applied to the machined weld area, and a second and lesser material coating is applied by laser welding to the area of plasma pockets formed on the intact rotor disk, with the sum of the heights A and B corresponding to an original height C in the weld area prior to its final machining. Then the defective rotor disk is detached in the root face and through the middle of the first material coating, and after that a new rotor disk already validated in the new construction with the (Continued)

root face validated in the new construction is welded on using appropriate welding parameters, and the weld area is machined, in line with the parameters already used for the new construction, down to the original height A. It is thus possible to provide repaired compressor or turbine drums matching the original component at low expense.

17 Claims, 1 Drawing Sheet

(52) U.S. Cl.
CPC .... *F05D 2230/10* (2013.01); *F05D 2230/234* (2013.01); *F05D 2230/30* (2013.01); *Y10T 29/49238* (2015.01); *Y10T 29/49318* (2015.01)

(58) Field of Classification Search
CPC ............... F01D 5/063; Y10T 29/49238; Y10T 29/49318; Y10T 29/4973; Y10T 29/4932; Y10T 29/49325; Y10T 29/4933; Y10T 29/49323; F05D 2230/234; F05D 2230/10; F05D 2230/30; F04D 29/321; F04D 29/644
USPC ................. 416/198 A, 201 R, 213 R, 244 A; 29/888.021
See application file for complete search history.

(56) References Cited

U.S. PATENT DOCUMENTS

| | | | | |
|---|---|---|---|---|
| 4,940,390 | A * | 7/1990 | Clark | B23K 9/046 415/200 |
| 5,914,055 | A * | 6/1999 | Roberts | B23K 9/044 219/137 WM |
| 6,118,098 | A * | 9/2000 | Amos | B23K 9/04 219/121.11 |
| RE37,562 | E * | 2/2002 | Clark | B23K 9/046 415/200 |
| 7,125,227 | B2 * | 10/2006 | Adde | B23K 20/1205 228/112.1 |
| 8,049,132 | B2 * | 11/2011 | Bouet | B23P 6/007 219/121.63 |
| 8,247,733 | B2 | 8/2012 | Zhu | |
| 8,266,800 | B2 * | 9/2012 | Segletes | F01D 5/005 29/402.06 |
| 8,720,056 | B2 * | 5/2014 | Mega | B23H 9/10 29/402.07 |
| 9,429,021 | B2 * | 8/2016 | Keller | B23K 9/16 |
| 2002/0127108 | A1 * | 9/2002 | Crall | B23K 20/129 416/213 R |
| 2005/0102835 | A1 * | 5/2005 | Trewiler | B23P 6/005 29/889.1 |
| 2006/0138093 | A1 * | 6/2006 | Peterson | B23K 9/00 219/75 |
| 2008/0011813 | A1 * | 1/2008 | Bucci | B23K 1/0018 228/119 |
| 2008/0040924 | A1 | 2/2008 | Haubold et al. | |
| 2008/0267775 | A1 * | 10/2008 | Grady | B23P 6/002 415/208.1 |
| 2010/0172761 | A1 * | 7/2010 | Le Goff | B23K 15/0053 416/198 A |
| 2010/0205805 | A1 * | 8/2010 | Mega | B23H 9/10 29/889.1 |
| 2010/0257733 | A1 * | 10/2010 | Guo | B23K 26/18 29/889.1 |
| 2013/0326876 | A1 * | 12/2013 | Weiss | B23K 35/004 29/888.021 |

FOREIGN PATENT DOCUMENTS

| | | | | |
|---|---|---|---|---|
| GB | | 1264467 | 2/1972 | |
| WO | WO 2013/075815 | | * 11/2011 | ......... B23K 15/0006 |

OTHER PUBLICATIONS

Translation of International Search Report and Written Opinion dated Apr. 3, 2012 from counterpart application.
German Search Report dated Dec. 2, 2011 from counterpart application.
International Search Report and Written Opinion dated Apr. 3, 2012 from counterpart application.

* cited by examiner

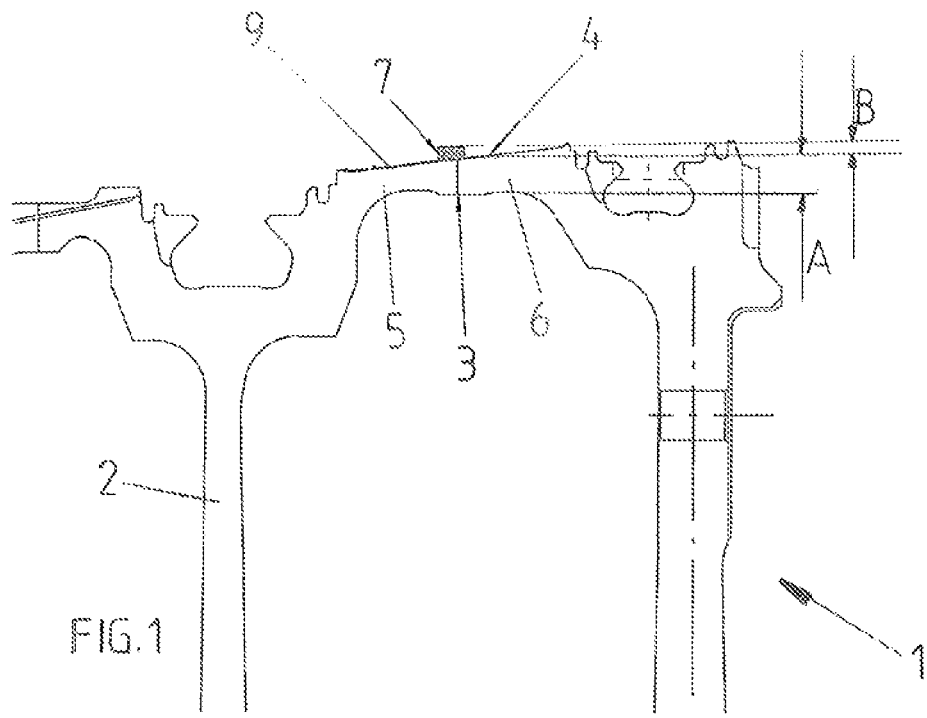
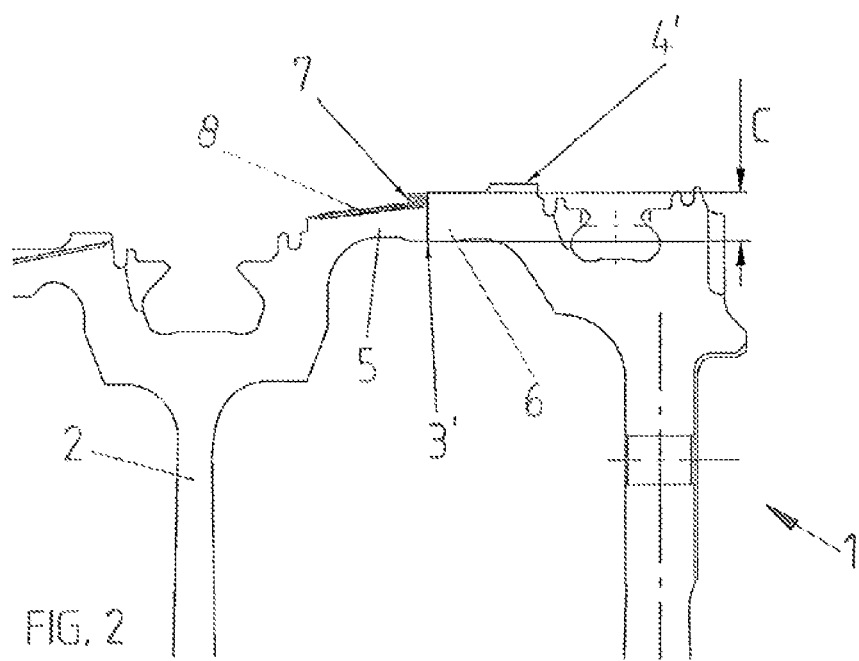

METHOD FOR REPAIRING COMPRESSOR OR TURBINE DRUMS

This application is the National Phase of International Application PCT/EP2012/050094 filed Jan. 4, 2012 which designated the U.S.

This application claims priority to German Patent Application No. DE102011002532.4 filed Jan. 11, 2011, which application is incorporated by reference herein.

This invention relates to a method for repairing two-stage or multi-stage compressor or turbine drums, consisting of rotor disks connected to one another by a root face and having separate or integral blades, by which method a defective rotor disk is separated by metal-cutting and replaced by a new rotor disk.

Two-stage or multi-stage compressor drums of gas-turbine engines consisting of two or more rotor disks welded to one another could, in the case of damage to one or more stages, be repaired by replacing the appropriate stage in that the rotor disk affected is separated by metal-cutting processes and replaced by a new rotor disk using known joining methods such as electron beam or friction welding. Problem-free application of a repair method of this type, in which it is also possible to replace several stages, is however hindered by the fact that during machining of the weld area the original weld joint thickness (root face length) is reduced. However, the production of special rotor disks with a weld joint thickness altered in comparison to standard rotor disks, necessary to achieve the validated welding parameters, is therefore either impossible or it involves considerable expense. The replacement of a damaged or worn compressor stage is furthermore also not possible because local melting in the weld area leads to the formation of weld sink zones and to a tapering of the rotor disk flange, and in the case of a subsequent smoothing by machining of the tapered area the required weld geometry is not assured. Finally, during machining of the weld area, the coating present in the plasma pockets formed there is removed, such that in this respect too an inadmissible undersize will be recorded. Furthermore, function-relevant elements located in the weld area, for example sealing lips, may start to melt and be impaired in their function.

The object underlying the invention is to provide a method for repairing welded compressor or turbine drums—two-stage or multi-stage—for an aircraft gas turbine that permits, without any inadmissible change in the original design and dimensions in the weld area and at low expense, the replacement of one or more defective rotor disks.

It is a particular object to provide solution to the above problems by a method in accordance with the features described herein.

Advantageous developments and useful embodiments will become apparent from the present description.

During the repair of welded two-stage or multi-stage compressor or turbine drums, which after welding are machined in the weld area down to a height A, the basic idea of the invention is that a first material coating with a height B extending on both sides from the root face is applied to the machined weld area, and a second and lesser material coating is applied by a suitable method (e.g. laser welding) to the area of plasma pockets formed on the intact rotor disk, with the sum of the heights A and B corresponding to an original height C in the weld area prior to its machining. Then the defective rotor disk is detached in the root face and through the middle of the first material coating, and after that a new rotor disk already validated in the new construction is welded on using the welding parameters validated in the new construction. In the following step, the weld area is machined, in line with the parameters already used for the new construction, down to the original height A. With the method in accordance with the invention, it is possible in the case of welded compressor or turbine drums machined in the weld area to replace damaged or worn rotor disks by new rotor disks already validated in the new construction and to weld them using the parameters already validated for the new construction and to machine them afterwards. It is thus possible to provide repaired compressor or turbine drums matching the original component at low expense.

In accordance with a further feature of the invention, a further material coating can be deposited onto function-relevant elements provided near the weld area and possibly partially melted during the welding process. To achieve the original shape, this material coating is then machined.

In an embodiment of the invention a heat treatment is conducted to reduce the residual stresses caused by the welded connection and by laser welding.

In a further embodiment of the invention the rotor disks are made of a titanium-based or nickel-based alloy.

In another embodiment of the invention the welded connection is made by electron beam welding or friction welding.

In yet another embodiment of the invention two or more defective rotor disks and/or spacer rings can be replaced by intact rotor disks and/or spacer rings validated in the new construction.

An exemplary embodiment of the invention is explained in more detail in light of the accompanying drawing. In the drawing, FIG. 1 shows a sectional view of a portion of a welded multi-stage compressor drum before the separation of a worn rotor disk, and FIG. 2 shows the compressor drum after separation of the worn rotor disk and welding of a new rotor disk.

The multi-stage compressor drum 1 shown in FIG. 1 for a gas-turbine engine and designed for separate blading has a defective (worn or damaged) rotor disk 4 connected to an intact rotor disk 2 by a circumferential root face 3. The defective rotor disk 4 should be replaced by a rotor disk 4' already approved (validated) during the original manufacture of the compressor drum 1. Here, the root face 3 has a height A reduced after the machining process.

At the point, of connection between the intact rotor disk 2 and the damaged rotor disk 4, a first and larger material coating 7 extending to both sides beyond the front surface of the root face 3 is applied by means of laser welding—in a first process step—onto the radially outer and machined surface of the two flanges 5, 6 of the rotor disks 2, 4. The height B of the material coating 7 is selected such that the total height (A+B) in the area of the root face 3 attains a value C corresponding to the height of the root face 3' (FIG. 2) during welding of the rotor disks in the new construction before the machining process.

In a second process step, a second and lesser (thinner) material coating 8 is optionally applied by laser welding in the area of the plasma pocket 9 provided on the outer surface of the flange 5 of the rotor disk 2. In the subsequent third process step, the defective rotor disk 4 to be replaced is detached precisely in the root face 3 and through the middle of the first material coating 7 from the intact rotor disk 2 by means of a metal-cutting or alternatively non-metal-cutting separating method.

Due to the height C—originally present in the new construction—of the flange 5 of the rotor disk 2 and built up again in the preceding process steps, it is now possible in the fifth process step to provide a new rotor disk 4' already validated in the new construction with a height C on the front face of the flange 6, and in the subsequent sixth process step—using the welding parameters already validated in the new construction—to weld it to the intact rotor disk 2 of the compressor drum 1.

In the seventh process step, the well area is machined with a stock removal rate also usual in the new construction. The stock removed in the area of the plasma pockets 9 too is compensated by the second material coating 8 deposited in this area during the second process step in the same way as weld sink zones created by local melting in the welding zone, so that after finish-machining the original and predetermined geometry can be created here too.

In accordance with an eighth process step, which is not shown in the drawing, a third material coating can be applied by laser welding to function-relevant elements, for example to sealing lips for a labyrinth seal moulded on a flange of a rotor disk close to the root face, the geometry of these elements being variable due to melting during manufacture of the welded connection between the two rotor disks 2, 4'. After manufacture of the welded connection, the sealing lips can be formed in the third material coating by the machining process.

In the ninth and last process step, a heat treatment is conducted to reduce the residual stresses generated both by the welded connection (e.g. electron beam welding or friction welding) and by the material coating 7, 8 during laser deposition welding—as in the new construction after joining up the individual rotor disks to a multi-stage compressor drum.

With the previously described repair method, one or more worn or damaged rotor disks located at different points can be replaced by intact rotor disks already validated for the new construction of the compressor drum 1, and using the same parameters, processes and devices as for the new construction. The method can also be used for different materials, for example titanium-based or nickel-based materials, and for compressor or turbine drums with separate or integral blading, when repair of individual blades is technically impossible or uneconomical, and particularly in those cases in which rewelding is permitted and the welding area has to be reworked by machining. The method can equally be applied in conjunction with the spacer rings arranged at different points of the drum.

LIST OF REFERENCE NUMERALS

1 Compressor drum
2 Intact rotor disk of 1
3 Root face (weld joint, weld seam)
3' Root face before reworking
4 Defective rotor disk
4' New rotor disk, validated in the new construction
5 Flange of 2
6 Flange of 4
7 First material coating on 3 (thick)
8 Second material coating on 9 (thin)
9 Plasma pocket of 2
A Height of root face 3 after machining
B Height of first material coating 7
C Height of root face 3' (A+B)

What is claimed is:

1. A method for repairing a multi-stage drum of a compressor or turbine, comprising:
    providing a multi-stage drum of a compressor or turbine, the drum including a defective rotor disk connected to an intact rotor disk at a root face, the drum having a weld area extending axially on both sides of the root face, the weld area having an existing height A2 at the root face,
    applying a first material coating to the drum at the weld area such that the first material coating has a height B extending axially on both sides from the root face, wherein a sum of the heights A2 and B equals at least a height C in the weld area prior to machining the weld area to an original operating height A1,
    applying a second material coating by laser welding to an area of plasma pockets formed on the intact rotor disk, the second material coating having a height less than height B,
    subsequently detaching the defective rotor disk from the intact rotor disk by cutting through the first material coating and the drum at the root face,
    providing a replacement rotor disk having at least the height C in the weld area at the root face,
    welding the replacement rotor disk to the intact rotor disk,
    machining the weld area down from the at least the height C to the original operating height A1.

2. The method in accordance with claim 1, and further comprising applying a third material coating to function-relevant elements positioned close to the weld area and subsequently machining the third material coating to achieve an original shape of the function-relevant elements.

3. The method in accordance with claim 2, and further comprising heat treating the drum to reduce residual stresses after welding the replacement rotor disk to the intact rotor disk.

4. The method in accordance with claim 3, wherein the rotor disks are made of a titanium-based or nickel-based alloy.

5. The method in accordance with claim 4, and further comprising welding the replacement rotor disk to the intact rotor disk by electron beam welding or friction welding.

6. The method in accordance with claim 5, wherein the detective rotor disk is at least one chosen from a bladed rotor disk and a spacer ring, and further comprising replacing at least two defective rotor disks with replacement rotor disks.

7. The method in accordance with claim 1, and further comprising heat treating the drum to reduce residual stresses after welding the replacement rotor disk to the intact rotor disk.

8. The method in accordance with claim 7, wherein the rotor disks are made of a titanium-based or nickel-based alloy.

9. The method in accordance with claim 8, and further comprising welding the replacement rotor disk to the intact rotor disk by electron beam welding or friction welding.

10. The method in accordance with claim 9, wherein the defective rotor disk is at least one chosen from a bladed rotor disk and a spacer ring, and further comprising replacing at least two defective rotor disks with replacement rotor disks.

11. The method in accordance with claim 1, wherein the rotor disks are made of a titanium-based or nickel-based alloy.

12. The method in accordance with claim 11, and further comprising welding the replacement rotor disk to the intact rotor disk by electron beam welding or friction welding.

13. The method in accordance with claim 12, wherein the defective rotor disk is at least one chosen from a bladed rotor disk and a spacer ring, and further comprising replacing at least two defective rotor disks with replacement rotor disks.

14. The method in accordance with claim 1, and further comprising welding the replacement rotor disk to the intact rotor disk by electron beam welding or friction welding.

15. The method in accordance with claim 14, wherein the defective rotor disk is at least one chosen from a bladed rotor disk and a spacer ring, and further comprising replacing at least two defective rotor disks with replacement rotor disks.

16. The method in accordance with claim 1, wherein the defective rotor disk is at least one chosen from a bladed rotor disk and a spacer ring, and further comprising replacing at least two defective rotor disks with replacement rotor disks.

17. The method in accordance with claim 1, wherein the existing height A1 equals the desired final height A2.

* * * * *